Patented May 13, 1952

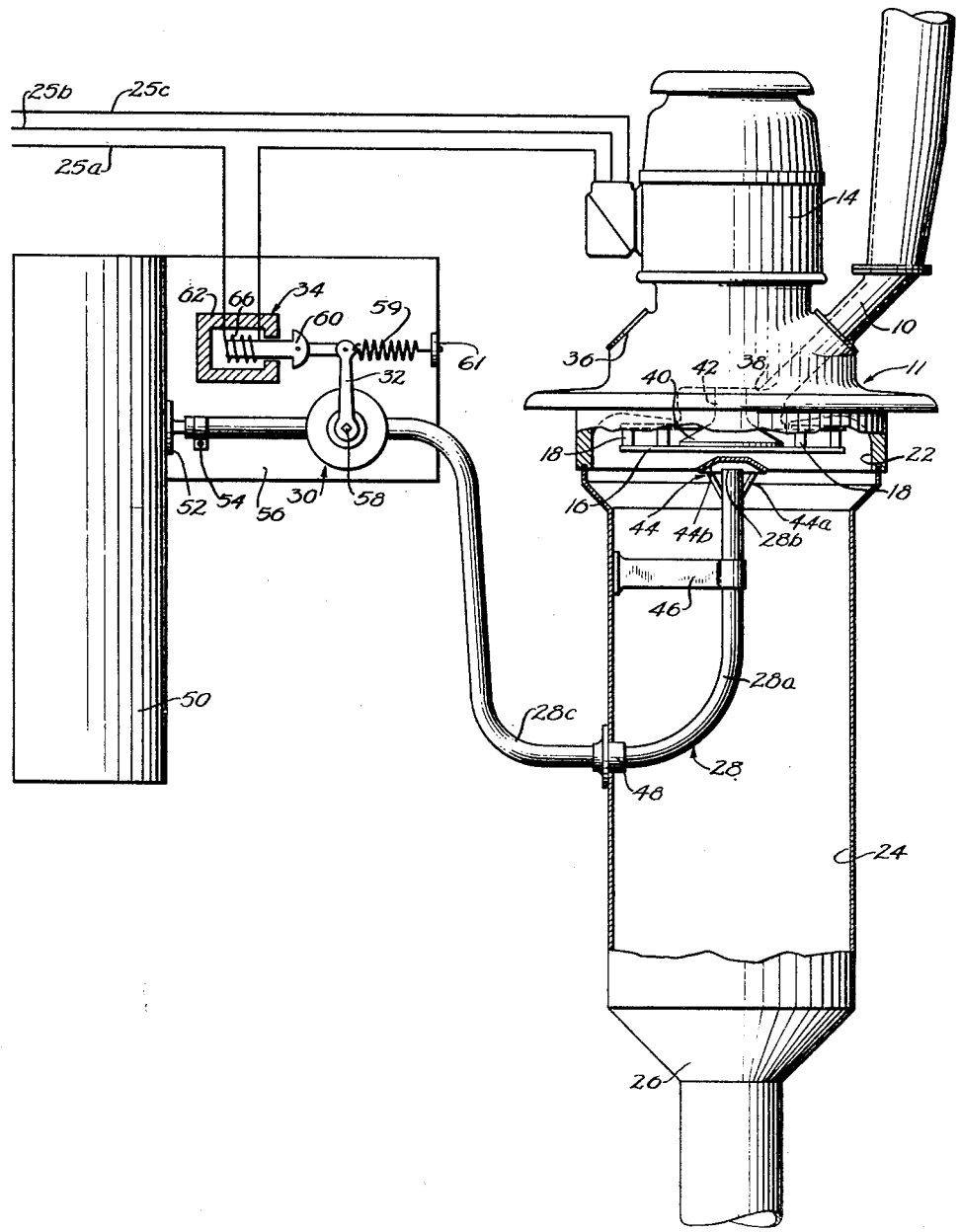

2,596,220

UNITED STATES PATENT OFFICE 2,596,220

GRAIN FLOW CONTROL

Robert B. Dodds, Woodbridge, Conn., assignor to The Safety Car Heating and Lighting Company, Inc., New Haven, Conn.

Application May 5, 1949, Serial No. 91,512

3 Claims. (Cl. 259—11)

This invention relates to an apparatus and method for mixing two materials. More particularly where a bulk particled product is to be processed by a centrifugal machine and mixed with a second material such as a liquid or gas my invention contemplates regulating the rate of flow of the second material in accordance with the volume of flow of the first.

An object of this invention is to provide, in a machine for mixing two materials, apparatus which will accurately control the rate of flow of one material so that it will vary in a substantially constant ratio with respect to the rate of flow of a second material. Another object of this invention is to provide apparatus of the character described which is simple in construction, efficient in operation and inexpensive to manufacture. A further object is to provide apparatus of the above character, for centrifugally processing a bulk particled product, mixing such product with a gas or liquid and proportioning the flow of gas or liquid with the flow of the product through the machine. Still another object of this invention is to provide a method for mixing a first material in a predetermined ratio with a second material. Other objects will be in part obvious and in part pointed out hereinafter.

The invention accordingly consists in the features of construction, combinations of elements and arrangements of parts and in the several steps and relation and order of each of the same to one or more of the others, all as will be illustratively described herein, and the scope of the application of which will be indicated in the appending claims.

The accompanying diagrammatic drawing is a view, partly in section, showing the mechanical and electrical components which make up an embodiment of the invention.

Similar reference characters refer to similar parts throughout the drawing.

Bulk particled products, for example grain and flour, are often processed in a centrifugal machine for a variety of purposes during which they are dispersed in a chamber where they may be mixed with an introduced gas or liquid. Where flour is so processed by a centrifugal machine, it is often desirable to add small quantities of a gas. Similarly, where grain is so processed, it may be desirable to add a liquid or gas. Also certain chemicals may be processed by such a machine at which time it may be advantageous to mix therewith a gas, liquid or particled solid. Wherever such mixing takes place in such a centrifugal machine, it is desirable to maintain a constant ratio of flow between the materials being mixed. However, there is often considerable fluctuation in the rate of flow of bulk product through the centrifugal machine and to maintain such ratio the flow of gas or liquid thereto must vary with these fluctuations.

The present invention provides apparatus for controlling the flow of gas, particled solid or liquid to such a centrifugal machine in proportion to the flow of the bulk product. The expression "bulk product" as used herein contemplates any material comprising a mass of individual solid particles, such as flour, grain and like foodstuffs, as well as chemicals, in a ground or granulated state. Such bulk products are flowable through chutes, ducts, etc., in a plant and may, where desired, flow through a centrifugal machine for processing.

The centrifugal machine may vary widely in structural detail depending upon the particular treatment imparted to the bulk product as it passes therethrough. Such machines are usually electrically driven and may be designed for the destruction of infestation in a food product; they may perform certain milling operations in a flour mill or they may be designed purely for mixing and blending chemical constituents. Such machines may also be designed for other purposes but the actual purpose or function of the machine is not important to the successful functioning of the present invention. The invention is concerned with the introduction of another material in liquid, gaseous or particled solid form and controlling the rate of such introduction in accordance with the rate of flow of the bulk product through the machine. However, for purposes of concrete illustration, there is here shown a centrifugal machine designed for the destruction of infestation in a bulk product similar to the machine disclosed in Hulse Patent No. 2,339,737.

In the illustrated embodiment of the invention, the bulk product flows through a chute 10 to a rotor 16 having a plurality of impactors 18 circumferentially arranged thereon. The rotor 16 is driven by a motor 14, here shown as three-phase, so that the bulk product is impelled outwardly by centrifugal force. The particles then strike an annular wall 22 which deflects them downwardly into a mixing chamber 24 and then into a hopper 26 connected with the bottom of the mixing chamber. The liquid particled solid or gas also flows into the mixing chamber 24 through a pipe assembly generally indicated at 28. The rate of flow thereof to the mixing chamber is controlled by a valve assembly generally indicated at 30. This valve assembly has a lever 32 which is pivoted by a solenoid generally indicated at 34 to vary the valve opening. The solenoid 34 is electrically connected to the motor 14 in an arrangement hereinafter to be described in detail thus to move the lever 32 in proportion to the load on the motor. The load on the motor is a function of the volume of flow of the bulk product through the machine. This determines the amount of current flowing to the motor and through the solenoid. Thus the solenoid regulates the valve opening in proportion to the flow of the bulk product to the machine. Consequently, the flow of gas, liquid or particled solid to the mixing chamber may be maintained in a predetermined constant ratio to the rate of flow of bulk product through the machine and to the mixing chamber.

The motor 14, here shown as three-phase and connected by bus bars 25a, 25b and 25c to a power source, is housed in the top of a casing generally indicated at 11. The chute 10 is connected to the casing 11 below the motor 14 and extends through the casing; its outlet 38 lies immediately above a frustoconical hub portion 40. A second chute (not shown) may extend through a hole 36 in the casing 11 opposite the chute 10. The hub portion 40 of the rotor is connected by the shaft 42 to the motor 14 to be rotated thereby. Thus the bulk product is thrown outwardly against the annular wall 22, which directs it downwardly into the mixing chamber 24 therebeneath. Motor 14 drives the rotor at a high rate of speed so that the bulk product is thrown outwardly and thence directed downwardly with great force. Therefore it arrives in the mixing chamber in a highly diffused state where it may be conveniently mixed with the gas, liquid or particled solid, as will be described.

A pipe 28a of the pipe assembly 28 is located within the casing below the rotor 16 and has a nozzle 28b which directs the flow of gas, particled solid or liquid outwardly into the mixing chamber. Nozzle 28b may be of any convenient standard construction depending somewhat on the character of the material being fed to the mixing chamber through pipe assembly 28. Thus a nozzle for diffusing a liquid will usually be of a different structure than one for the diffusion of a gas. There is here shown diagrammatically a nozzle for the diffusion of a gas. Thus, the nozzle includes a deflecting baffle suspended above the top of the pipe 28a by brackets 44a and having a depending rim portion 44b. Baffle 44 thus deflects the gas outwardly and downwardly in the mixing chamber so that it will be thoroughly mixed with the bulk product flowing downwardly therethrough in a highly diffused state.

The upper vertical portion of pipe 28a is supported in the position shown by an elbow 46 connected to the inner walls of the mixing chamber 24. The lower portion of the pipe curves horizontally and is connected to the collar 48 in the wall of the mixing chamber. A pipe 28c of the pipe assembly is connected to the collar 48 and to container 50 by a collar 52; it is also secured to a panel 56 by means of an angle bracket 54. Container 50 stores the gas, liquid or particled solid to be mixed with the bulk product. This material may be stored in the container under pressure or suitable standard pumping or feeding equipment (not shown) may be provided. Thus, the gas, liquid or particled solid flows from the container through the pipes 28c and 28a into the mixing chamber 24 at a rate determined by the valve 30 and more particularly by the position of the valve arm 32 mounted to pivot about the pin 58 as an axis. The end of lever 32 is connected to a spring 59 secured to a pedestal 61. The armature 60 of solenoid 34 is also connected to the end of the lever 32 and thus opposes the spring 59. The solenoid includes an iron core 62 surrounding the armature while a coil 66 is wound on the armature and is connected in series with the motor 14 by way of bus bar 25a. Thus current to the motor also flows through coil 66 of the solenoid while the position of valve arm 32 which determines the valve opening will be dependent on the amount of current flowing to the motor. As noted above, the load on the motor determines current flow thereto.

Accordingly, the bulk product flows through the chute 10 to be discharged outwardly against annular wall 22 and thence downwardly to the mixing chamber 24. Here it is thoroughly intermixed with the gas, liquid or particled solid diffused into the mixing chamber by nozzle 28b.

As previously stated, the load on motor 14 is proportional to the rate of flow of the bulk product through chute 10 to the rotor 16. Because the motor is connected directly to the power source, variations in the load on the motor cause similar variations in the current flowing to the motor and, consequently, through the winding 66. This current flow determines the opening of the valve 30. Thus the flow of gas, particled solid or liquid from nozzle 28b is proportional to the load on the motor, i. e. the volume of bulk product flowing through the machine.

As previously stated, the flow of gas, liquid or particled solid to the mixing chamber is maintained in a fixed ratio to the amount of bulk product flowing into the chamber all by way of the action of the solenoid in response to the load on the motor and consequent current flow thereto. With no load, i. e. no bulk product flowing to the machine, the solenoid moves the valve to a closed position against the action of spring 59. Whenever the bulk product flows through the machine creating a load on the motor and consequent increased current flow thereto solenoid 34 opens the valve 40 proportionately. Accordingly, the flow of gas, liquid or particled solid to the chamber 24 through the nozzle 44 is maintained in a fixed ratio to the flow of bulk product through the machine.

It is within the contemplation of the present invention to feed a particled product similar in physical characteristics to the bulk product defined above through the pipe assembly 28 for mixture with the bulk product being processed by the machine. To do so would involve the substitution of well-known valving apparatus in the pipe assembly and dispensing apparatus in the mixing chamber to bring about the same result, i. e. the regulation of the flow of particled solid from the pipe assembly to provide a fixed ratio between the two flows to the mixing chamber.

Accordingly there is provided a system whereby a material, gaseous, liquid or particled solid may be delivered and dispersed in a mixing chamber associated with a centrifugal machine so that the flow of such material to the mixing chamber will always be maintained in fixed ratio to the volume of bulk product flowing through the machine. The advantages of such a system are many. In flour, grain or similar products, as well as certain chemical products being processed by a centrifugal machine, it is often highly desirable to mix another product in fixed proportion. In flour, such things as bleaching agents, enriching agents, etc. may be added. In grain, there are a variety of fumigating agents which may be added. And in the field of chemical mixing, the variety of mixing possibilities is unlimited and undefinable.

Accordingly, there is provided a method and an apparatus for mixing a first material, such as a bulk product, with a second material in a predetermined ratio, which ratio is maintained constant regardless of the fluctuation of flow of the bulk product through the machine.

It will thus be seen that the several objects hereinabove referred to have been carried out in a practical and economical manner.

Since many possible embodiments may be made of the mechanical and electrical features of the above invention, and since the art herein described may be varied in various parts, all without departing from the scope of the invention, it is to be understood that all matter hereinbefore set forth or shown in the accompanying drawing is to be interpreted as illustrative and not in a limiting sense.

What is claimed is:

1. In apparatus for continuously mixing a particled bulk product and a gas in accurate proportions, a casing, an electric motor mounted on said casing, a rotor driven by said motor and having a plurality of circumferentially spaced impactors, means for directing said particled bulk product to said rotor, the load on said motor being in proportion to the rate of flow of said bulk product through said last-mentioned means, an annular wall radially spaced from said rotor and providing a surface for impacting said particled bulk product and deflecting it downwardly, said casing also defining a mixing chamber below said annular wall, flow means for leading said gas into said mixing chamber and mixing it with said particled bulk product, valve means adjustably positioned in said flow means to control the rate of flow of said gas into said mixing chamber, and electromotive means having a winding electrically connected to said motor to provide a current flow through said winding in proportion to the load upon said motor, said electromotive means also having an armature operatively associated with said valve to regulate the flow of gas proportionately to the rate of flow of said particled bulk product.

2. In apparatus for continuously mixing two flowable products in accurate proportions, a casing construction defining a mixing chamber, conduit means connected to the top of said casing construction for introducing one of said products into said chamber, high speed rotary means in said chamber for distributing said product uniformly therethrough, means for driving said rotary means, pipe means for introducing the other of said products into said chamber wherein it is mixed with said first product as said first product is distributed, said driving means including an electric motor the load on which varies with the amount of said first product distributed by said rotary means, a solenoid having a movable armature, a winding disposed about said armature to exert a force thereon in proportion to the current flowing therethrough, said winding being connected in series with said motor, a valve in said pipe means, a lever for operating said valve, means connecting said lever to said armature whereby said lever is moved in one direction when said winding is energized, and means connected to said lever for exerting a constant bias thereon opposite to the pull of said armature, whereby the rate of flow of said second product through said pipe means is a function of the load on said motor and accordingly a function of the flow of said first product through said conduit means.

3. In apparatus for continuously mixing two flowable products in accurate proportions, a casing defining a mixing chamber, a conduit connected to the top of said casing for conducting one of said products into said chamber adjacent the center portion thereof, rotary means in said chamber for distributing said product uniformly and radially therethrough, means to drive said rotary means, a pipe leading into the bottom of said chamber substantially coaxially of said rotary means for introducing the other of said products into said chamber to be mixed with said first product as the first product is distributed, said driving means including an electric motor the load on which varies with the amount of said first product distributed by said rotary means, and means having a portion connected to said motor and a portion associated with said pipe for controlling the rate of flow of said second product into said chamber in accordance with the load on said driving means.

ROBERT B. DODDS.

REFERENCES CITED

The following references are of record in the file of this patent:

UNITED STATES PATENTS

| Number | Name | Date |
|---|---|---|
| 1,334,395 | Patterson | Mar. 23, 1920 |
| 1,646,582 | Halliburton | Oct. 25, 1927 |
| 2,339,737 | Hulse | Jan. 18, 1944 |

FOREIGN PATENTS

| Number | Country | Date |
|---|---|---|
| 135,905 | Austria | Dec. 27, 1923 |